Patented Oct. 20, 1925.

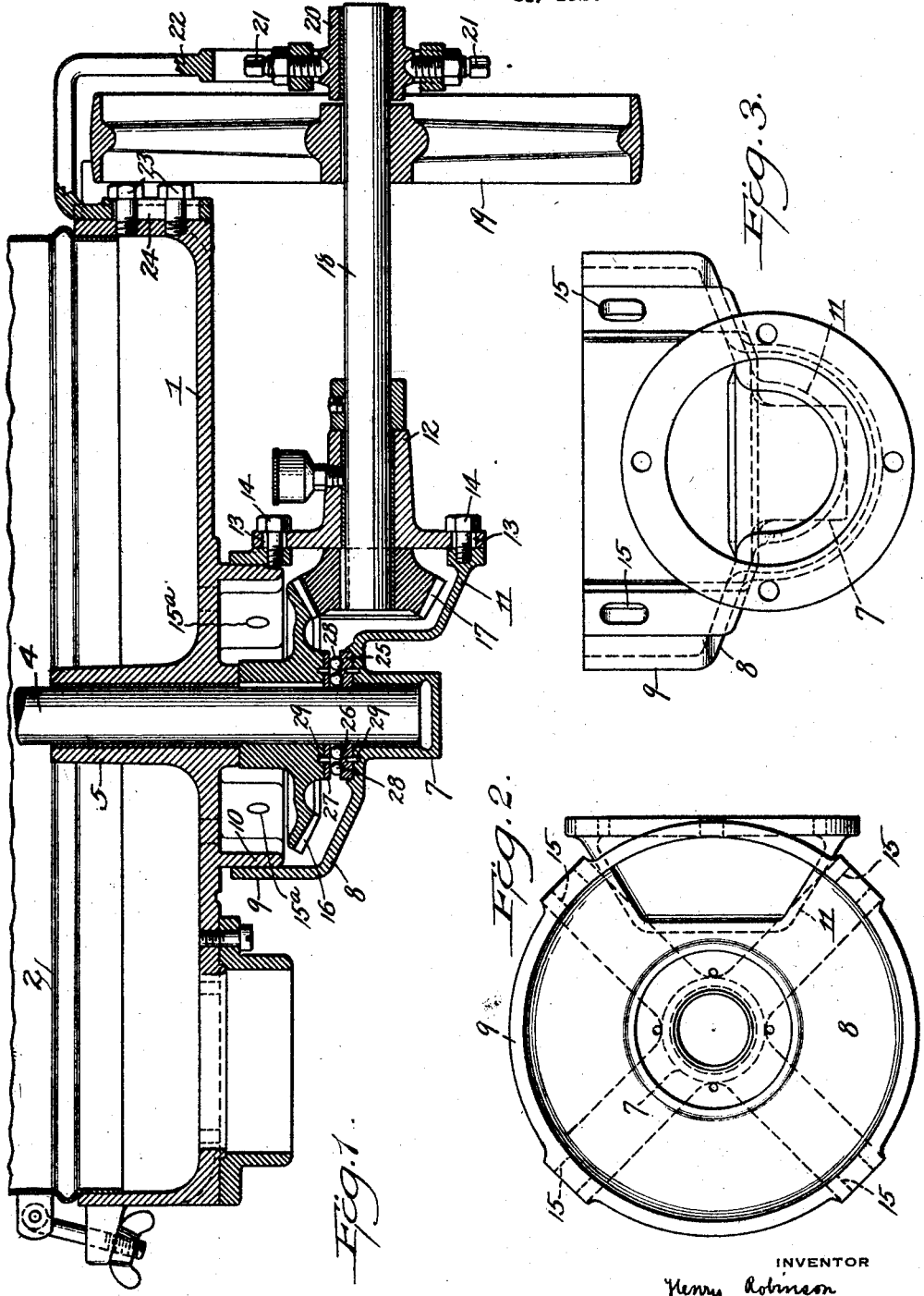

1,558,286

UNITED STATES PATENT OFFICE.

HENRY ROBINSON, OF LINDENHURST, NEW YORK.

VEGETABLE-PARING MACHINE.

Application filed December 11, 1924. Serial No. 755,186.

*To all whom it may concern:*

Be it known that I, HENRY ROBINSON, a citizen of the United States, and a resident of Lindenhurst, county of Suffolk, State of New York, have invented certain new and useful Improvements in Vegetable-Paring Machines, of which the following is a specification.

This invention relates to certain improvements upon the class of machines described in my prior Patents Nos. 942,932, dated December 14, 1909, and 1,488,617, dated April 1, 1924, in which vegetables placed in a container are subjected to an abrading action by imparting to the vegetables a motion which tosses them individually against an abradant surface and maintains their constant rotation and interplay throughout the mass until the peel is all or substantially all removed.

The invention comprises certain specific improvements upon the apparatus, which can best be explained by reference to the accompanying drawings, in which—

Figure 1 is an enlarged, sectional view through the driving mechanism.

Figure 2 is a plan view of the gear housing.

Figure 3 is a side view of the same.

In the drawings, 1 represents a bottom pan having a circular shape, with an upwardly projecting peripheral flange to which the container 2 is attached. The bottom pan 1 is supported by legs not shown. A shaft 4 mounted in a central vertical bearing 5 in the bottom pan 1 has attached to it on its upper end a rotating agitator such as has been described, for instance, in my prior patents. The lower end of the shaft is journalled in an extension 7 on a gear housing 8, which has a cylindrical portion 9 at its upper end adapted to fit over a similar cylindrical flange 10 extending downward from the bottom pan. This gear housing also has a side extension 11 for the driving pinion, to which is secured a flanged journal bearing 12. The housing complete therefore consists of the main body 8, its extension 11, and the bearing flange 12. The flange of the journal bearing 12 has slotted holes at 13 (see Figure 1) through which extend bolts 14, whereby the bearing is secured to the extension 11 of housing 8. The holes are slotted vertically in order to permit the vertical adjustment of the bearing for alignment of the gears and the shaft and for taking up wear. Four bolt holes 15 also in the form of vertical slots are made in the housing 8 and through these holes and screwheaded holes 15$^a$ in the flange 10, pass bolts that secure the housing in place on the flange, the vertically slotted holes permitting of vertical adjustment for alignment. In the housing 8 is a bevel wheel 16 mounted securely on the vertical shaft 4 and meshing with it is a bevel pinion 17 carried by a drive shaft 18, upon which is mounted a driving pulley 19. The outer end of the shaft 18 is supported in a swivel bearing 20, held by supporting and adjusting screws 21 in a hanger or bracket 22 that is secured to the bottom pan 1 by bolts 23, a slot 24 being provided in the bracket through which the bolts pass, and which permits of adjustment of the bracket for alignment purposes. The weight of the shaft 4 and the rotating members connected therewith is sustained by a ball bearing 25, the balls running in a hardened raceway 26 supported on the recessed shelf of the housing 8 and a hardened plate 27 secured to the bottom face of the hub of the gear 16 forms the upper bearing for the balls which are shown at 28. The plates 25, 27 have pins 29, entering socket holes in the housing and gear face respectively, to prevent rotation, while permitting ready insertion and removal.

In assembling, the gears being properly mounted on the shafts, the vertical shaft may be inserted in its bearing 5 and the housing 8 then applied and slipped over the snug-fitting projecting ring or flange 10, and secured in place by the bolts through the slotted holes 15, the vertical adjustment being made so that the ball bearing 25 will hold the bevel wheel 16 between the ball bearing and the bottom pan 1 with just the right amount of snugness permissible with freedom of rotation. The shaft 18 with its pinion 17 and its bearing support 12 may then be applied and the bolts 14 used to clamp the flange of the bearing in position to give the proper mesh to the gears. The bracket 22 may then be fastened by means of bolts 23 to the bottom pan 1 and the outer bearing 20 centered vertically by means of said screws, any side adjustment necessary being made by screws 21, which have pointed bearings in their seats. When so assembled, the housing 8 may be filled with oil or grease so that the journal bearings 7 and the ball bearings and the gears will be amply and continuously lubricated.

It will be observed that the construction described affords ready means of setting up and adjusting the various parts of the gear and associated parts. The manufacture is economized and easily maintained. The adjusting devices are readily accessible from the outside, so that adjustment of all parts is effected without taking down the gear or removing any parts. By removing the screws 23 and 15ª, the mechanism may be quickly disassembled. The gear housing 8, with its extension 7, provides an additional bearing at the lower end of the shaft, preventing lateral motion and so preventing friction and wear on the main bearing in the pan—the gear 16 being placed between the two bearings. The lip or ring 10 being turned true, and the cylindrical upper rim of the housing 8 slipping snugly thereon, the lower bearing 7 always comes into alignment with the bearing 5, when the parts are assembled. The housing affords an oil-tight receptacle for lubricant without packing. The weight of the rotor is entirely taken by the ball bearings, whose life as well as that of the gears depends on lubrication, and such lubrication is assured by the oil-tight housing, adapted to hold the lubricant without packing.

I claim:—

1. In a machine of the character described, the combination comprising a supporting frame having a main bearing for a vertical driven shaft and a depending flange, a driving shaft and a driven shaft, a gear and a pinion connecting the same, a housing for the gears attached to the depending flange from the supporting frame, a step bearing interposed between the gear and the housing, a journal bearing for the driven shaft in said housing on the opposite side of said gear from the main bearing, and a flanged bearing for the driving shaft attached to the housing.

2. In a machine of the character described, the combination comprising a supporting frame having a main bearing for a vertical driven shaft and a depending flange, a driving shaft and a driven shaft, a gear and a pinion connecting the same, a housing for the gears attached adjustably to the depending flange from the supporting frame, a roller or ball bearing interposed between the gear and the housing, a bearing for the driven shaft in said housing on the opposite side of said gear from the main bearing, a flanged bearing for the driving shaft, and adjustable means for attaching said last named bearing to said housing.

3. In a machine of the character described, the combination comprising a supporting frame having a vertical main bearing, a driven shaft journaled in said main bearing, a flange element depending from said frame, a driving shaft, a gear and a pinion connecting said shafts, a housing element for the gears, said housing element being supported from said flange element, one of said elements having vertical slots and the other of said elements having bores registering with said slots, screw members in respective bores and slots for fixing said elements in operative position and permitting relative adjustment thereof, a step bearing interposed between the gear and the housing, and a bearing for the driving shaft in connection with the housing.

4. In a machine of the character described, the combination comprising a supporting frame having a vertical main bearing, a driven shaft journaled in said main bearing, a flange element depending from said frame, a driving shaft, a gear and a pinion connecting said shafts, a housing element for the gears, said housing element being supported from said flange element, one of said elements having vertical slots and the other of said elements having bores registering with said slots, screw members in respective bores and slots for fixing said elements in operative position and permitting relative adjustment thereof, a step bearing interposed between the gear and the housing, a flanged bearing for the driving shaft, and means for adjustably securing the flange of said bearing to said housing.

HENRY ROBINSON.